United States Patent Office 3,448,148
Patented June 3, 1969

3,448,148
PRODUCT PREPARED BY REDUCTION OF
HEXAFLUOROGLUTARYL CHLORIDE
Charles F. Baranauckas, Niagara Falls, N.Y., Donald H. Campbell, Niagara-on-the-Lake, Ontario, Canada, and Russell L. K. Carr, Grand Island, N.Y., assignors to Hooker Chemical Corporation, Niagara Falls, N.Y., a corporation of New York
No Drawing. Continuation of application Ser. No. 178,229, Mar. 8, 1962. This application Oct. 19, 1966, Ser. No. 587,937
Int. Cl. C07c 51/58, 53/34
U.S. Cl. 260—544   1 Claim

ABSTRACT OF THE DISCLOSURE

There are described novel compositions of the formula:

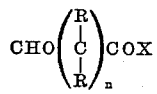

wherein $n$ is a number from two to three inclusive, and R is selected from the group consisting of hydrogen, perfluoroalkyl, fluorine, perfluorocycloalkyl, perfluoroaryl, alkyl, cycloalkyl, aryl and mixtures thereof, wherein at least one of the R's contains fluorine, and X is selected from the group consisting of bromine, chlorine and fluorine. There is also described a process for preparing said compositions.

---

This invention relates to new compositions of matter and their methods of preparation. More specifically, the inventive concept herein resides in novel fluorinated aldehydic acid halides.

The novel compositions of this invention may be illustrated by the general formula:

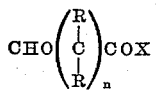

wherein $n$ is a number from two to three inclusive, and R is a substance selected from the group consisting of hydrogen, perfluoroalkyl, fluorine, perfluorocycloalkyl, perfluoroaryl, alkyl, cycloalkyl, aryl and mixtures thereof, wherein at least one of the R's contain fluorine, and X is a substance selected from the group consisting of bromine, chlorine and fluorine.

Typical compositions within the above general formula are:

4-formyl-2,2-difluorobutyryl chloride,
4-formyl-3,3-difluorobutyryl chloride;
4-formyl-4,4-difluorobutyryl chloride;
4-formyl-2,2,3,3-tetrafluorobutyryl chloride;
4-formyl-2,2,4,4-tetrafluorobutyryl chloride;
4-formyl-3,3,4,4-tetrafluorobutyryl chloride;
4-formyl-2,3,3,4,4-pentafluorobutyryl chloride;
4-formyl-2,2,3,4,4-pentafluorobutyryl chloride;
4-formyl-2,2,3,3,4-pentafluorobutyryl chloride;
4-formyl-2-trifluoromethylbutyryl chloride;
4-formyl-2-pentafluoroethylbutyryl chloride;
4-formyl-2-heptafluoropropylbutyryl chloride;
4-formyl-2-nonafluorobutylbutyryl chloride;
4-formyl-3-trifluoromethylbutyryl chloride;
4-formyl-3-pentafluoroethylbutyryl chloride;
4-formyl-3-heptafluoropropylbutyryl chloride;
4-formyl-3-perfluoroundecylbutyryl chloride;
4-formyl-3-perfluorocyclobutylbutyryl chloride;
4-formyl-3-perfluorocyclopentylbutyryl chloride;
4-formyl-3-perfluorocyclohexyl-butyryl chloride;
4-formyl-3-perfluorophenylbutyryl chloride;
4-formyl-3-trifluoromethyl-2,2,3,4,4-pentafluorobutyryl chloride;
4-formyl-4-trifluoromethyl-2,2,3,3,4-pentafluorobutyryl chloride;
4-formyl-3-trifluoromethyl-2,2,4,4-tetrafluorobutyryl chloride;
4-formyl-4-trifluoromethyl-2,2,3,3-tetrafluorobutyryl chloride;
4-formyl-3-trifluoromethyl-2,2,3-trifluorobutyryl chloride;
4-formyl-3-trifluoromethyl-2,2-difluorobutyryl chloride;
4-formyl-3-trifluoromethyl-4,4-difluorobutyryl chloride;
4-formyl-4-trifluoromethyl-2,3-difluorobutyryl chloride;
4-formyl-4-trifluoromethyl-3,3-difluorobutyryl chloride;
4-formyl-4-pentafluoroethyl-3,3-difluorobutyryl chloride;
4-formyl-4-pentafluoroethyl-2,2,3,3-tetrafluorobutyryl chloride;
4-formyl-3,3-bis(trifluoromethyl)butyryl chloride;
4-formyl-3,3-bis(trifluoromethyl)-2,2,4,4-tetrafluorobutyryl chloride;
4-formyl-3,3-bis(trifluoromethyl)-2,2-difluorobutyryl chloride;
4-formyl-3,3-bis(trifluoromethyl)-4,4-difluorobutyryl chloride;
4-formyl-3,3-bis(trifluoromethyl)-2,2,4-trifluorobutyryl chloride;
4-formyl-3,3-dimethyl-2,2,4,4-tetrafluorobutyryl chloride;
4-formyl-3,3-dimethyl-2,2-difluorobutyryl chloride;
4-formyl-3,3-dimethyl-4,4-difluorobutyryl chloride;
4-formyl-3,3-dimethyl-2,2,4-trifluorobutyryl chloride;
4-formyl-3,3-dimethyl-2,4,4-trifluorobutyryl chloride;
4-formyl-2,3-dimethyl-2,3,4-trifluorobutyryl chloride;
4-formyl-3-ethyl-3-methyl-2,2,4,4-tetrafluorobutyryl chloride;
4-formyl-3,3-diethyl-2,2,4,4-tetrafluorobutyryl chloride;
3-formyl-2,2-difluoropropionyl chloride;
3-formyl-3,3-difluoropropionyl chloride;
3-formyl-2,3-difluoropropionyl chloride;
3-formyl-2,2,3,3-tetrafluoropropionyl chloride;
3-formyl-2,2,3-trifluoropropionyl chloride;
3-formyl-2,3,3-trifluoropropionyl chloride;
3-formyl-2-trifluoromethylpropionyl chloride;
3-formyl-3-trifluoromethylpropionyl chloride;
3-formyl-2-pentafluoroethylpropionyl chloride;
3-formyl-3-pentafluoroethylpropionyl chloride;
3-formyl-2-heptafluoropropylpropionyl chloride;
3-formyl-3-heptafluoropropylpropionyl chloride;
3-formyl-2-nonafluorobutylpropionyl chloride;
3-formyl-3-perfluoroundecylpropionyl chloride;
2-formyl-3-perfluorocyclobutylpropionyl chloride;
3-formyl-3-perfluorocyclopentylpropionyl chloride;
3-formyl-3-perfluorocyclohexylpropionyl chloride;
3-formyl-3-perfluorophenylpropionyl chloride;
3-formyl-3-trifluoromethyl-2,2,3-trifluoropropionyl chloride;
3-formyl-3-trifluoromethyl-2,2-difluoropropionyl chloride;
3-formyl-3-trifluoromethyl-3-fluoropropionyl chloride;
3-formyl-3-trifluoromethyl-2-fluoropropionyl chloride;
3-formyl-3-ethyl-2,2-difluoropropionyl chloride;
3-formyl-3-methyl-2,2-difluoropropionyl chloride;
3-formyl-3-phenyl-2,2-difluoropropionyl chloride;
3-formyl-2-phenyl-3,3-difluoropropionyl chloride;
3-formyl-3,3-bis(trifluoromethyl)propionyl chloride;
3-formyl-3-trifluoromethyl-3-heptafluoropropyl-2,2-difluoropropionyl chloride;
3-formyl-2,2-bis(pentafluoroethyl)propionyl chloride;
3-formyl-2,3-bis(pentafluoroethyl)2,3-difluoropropionyl chloride;
3-formyl-3,3-dimethyl-2,2-difluoropropionyl chloride;

3-formyl-3,3-diethyl-2,2-difluoropropionyl chloride;
3-formyl-2-methyl-2-trifluoromethyl-3,3-difluoropropionyl chloride;
3-formyl-3-pentafluoroethyl-2-trifluoromethylpropionyl chloride.

The compositions of this invention have utility as intermediates in the preparation of formyl-carboxylic acids, dialdehydes, nitrogen-containing carbonyl derivatives, and other chemical substances, as reducing agents by virtue of their aldehydic function, and as anti-foaming agents.

The compositions of this invention may be prepared as indicated in the general equation below:

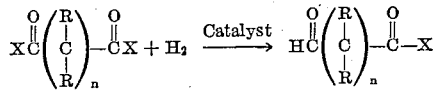

wherein $n$ is a number from two to three inclusive, R is a substance selected from the group consisting of hydrogen, fluorine, perfluoroalkyl, perfluorocycloalkyl, perfluoroaryl, alkyl, cycloalkyl, aryl, and mixtures thereof, wherein at least one of the R's contains fluorine, and wherein X is a substance selected from the group consisting of bromine, chlorine and fluorine. A specific and typical starting material illustrating a specific embodiment of the general equation above, is given in the equation below:

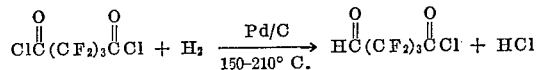

Hexafluoroglutaryl chloride and hydrogen are reacted over a palladium on carbon catalyst and the resulting product mixture is rectified to give 4-formyl-2,2,3,3,4,4-hexafluorobutyryl chloride.

In the process for the preparation of the components of this invention, reaction temperatures ranging from abount one hundred and ten degrees to about two hundred and twenty degrees centigrade may be used. Also, although an aged palladium on carbon catalyst is preferred in the above reaction, other catalysts such as palladium on carbon, ruthenium on carbon, copper-chrome oxide, nickel on magnesium oxide, nicket on kieselguhr, and mixtures thereof may be employed.

It is therefore an object of this invention to provide chemical compositions heretofore not available in the prior art.

It is another object of this invention to provide processes for the preparation of said compositions of this invention.

Other objects will become apparent to those skilled in the art upon a further reading of this disclosure.

The following examples further illustrate the particulars of this invention, it being understood that the material and other specifics are meant to be illustrative only and not to limit this invention to the specific embodiments therein.

EXAMPLE 1

The apparatus used comprised a vertical glass tubing reactor about seventeen inches long, heated by a solvent boiling at about one hundred and fifty-two degrees centigrade, which was refluxed through a jacket surrounding the reactor. It contained an additional system such that hexafluoroglutaryl chloride and hydrogen gas could be introduced into the reactor, and a receiver connected to the exit end of the reactor, which receiver was also connected to a trap immersed in a Dry Ice-acetone cooling bath. The reactor system was also equipped with a pressure release valve (for purposes of safety), a thermocouple well and a thermocouple connected to a potentiometer. The heated section of the reactor was filled with a catalyst of one percent palladium on carbon.

Hexafluoroglutaryl chloride and hydrogen gas were passed through the reactor during a period of about 18.5 hours, at which time the temperatures in the reactor were in the range of about one hundred and fifty-two to two hundred and ten degrees. A total of about nine hundred and fifty grams of product were collected, which, on successive fractionation, led to the isolation of fifty-six grams of material of boiling point one hundred and twelve to one hundred and thirteen degrees centigrade, $N^{22}$ 1.3444, $d^{22}$ 1.69. Hydrolysis of this material produced acids and chloride ions. The hydrolyzed material was treated with silver nitrate and filtered to remove chloride ions, and treatment of this filtrate with ammoniacal silver nitrate and sodium hydroxide produced a silver mirror. An infrared spectrum showed adsorption for C=O, CF and CH being present. The evidence presented suggests $CHO(CF_2)_3COCl$ as a possible structure for this material.

Various changes and modifications may be made in the method and composition of this invention, certain preferred forms of which have been described, without departing from the spirit and scope of this invention. These modifications of this basic invention are to be regarded as within the scope and purview of this invention.

EXAMPLE 2

Hexafluoroglutaryl chloride and hydrogen were reacted over a catalyst of palladium on carbon after the manner of Example 1 except that the refluxing liquid used to heat the reactor had a boiling point of about 112° C. and internal reactor temperatures were in the range 110°–120° C. Examination of the infrared spectrum of the product failed to reveal evidence of the presence of the hemiacetal, 2-hydroxy-3,3,4,4,5,5-hexafluorotetrahydropyran; of $CHO(CF_2)_3CHO$ or its polymer; of

or its lactone. Fractionation of the product led to the recovery of material, B.P. 38–48° C. at 30 mm. pressure, $n^{23}$ 1.3515 to 1.3518, having an infrared spectrum very much like that of the product of Example 1.

We claim:
1. The product of the process of reducing hexafluoroglutaryl chloride by passing said hexafluoroglutaryl chloride and hydrogen gas over a palladium catalyst at a temperature in the range of about 152 to 210 degrees centigrade and fractionating the product to obtain a final product having a boiling point of 112 to 113 degrees centigrade, an index of refraction of 1.3444 and a density of 1.69.

References Cited

Mosettig and Mozingo, "The Rosenmund Reduction of Acid Chlorides to Aldehydes," Organic Reactions, vol. 4, pp. 362–377 (1948).

LORRAINE A. WEINBERGER, *Primary Examiner.*

JAMES NIELSEN, *Assistant Examiner.*